UNITED STATES PATENT OFFICE 2,524,145

PREPARATION OF MALEIMIDE AND N-SUB-STITUTED DERIVATIVES

Pliny O. Tawney, Passaic, N. J., assignor to United States Rubber Company, New York, N. Y., a corporation of New Jersey No Drawing. Application March 3, 1948,
Serial No. 12,892

3 Claims. (Cl. 260—313)

My invention is concerned with the preparation of maleimide and certain N-substituted derivatives thereof, in a novel manner.

I have discovered that said chemicals can be prepared by the pyrolytic decomposition of derivatives of delta-4-tetrahydrophthalimide in which the carbon atoms of the 3 and 6 positions are connected through one of the class consisting of an alkylene group, a 9,10-anthrylene group, and an oxygen atom. These various latter members are grouped together for the reason that they each were present in the starting material, do not interfere with the formation of the maleimide or N-substituted derivative, on the thermal decomposition of the starting material.

I am particularly concerned with the preparation of maleimide for the reasons that for commercial operations, prior methods are practically useless as well as prohibitively expensive in view of the low yields of maleimide and/or the extensive side-reactions encountered.

One of the objects of my invention is to provide a simple method whereby yields of from 80 to essentially 100% of maleimide can be obtained in a commercially feasible, efficient and comparatively inexpensive manner. This method comprises the pyrolytic decomposition of one of the class consisting of a 3,6-endoalkylene-delta-4-tetrahydrophthalimide, a 3,6-endo(9,10-anthrylene)-delta-4-tetrahydrophthalimide and a 3,6-epoxy-delta-4 - tetrahydrophthalimide, and having the type formula:

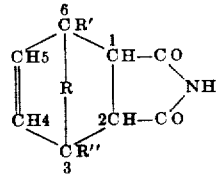

where R is an oxygen atom, an alkylene group such as methylene, ethylidene and trimethylene, or the 9,10-anthrylene group, and R' and R" are hydrogen or alkyl, e. g., methyl and ethyl. Such starting materials are available from the reaction of the appropriate cyclic conjugated diene with maleic anhydride and treatment of the product with ammonia, ammonium hydroxide or an ammonium salt, e. g., ammonium carbonate, to secure conversion of the anhydride to the corresponding imide (J. Org. Chem. 10, 149–58 (1945)).

The reaction of my invention is carried out by heating the delta-4-tetrahydrophthalimide or derivative containing a 3,6-endo-bridge as defined above, at temperatures above its melting point and particularly in the range of 200–500° C. A preferred method is to pass the vaporized delta-4-tetrahydrophthalimide derivative in the presence or absence of an inert diluent, e. g., nitrogen, through a heated reaction tube of glass, iron, steel, nickel, etc., which may be packed with an inert, fragmented material such as beads or chips of quartz and glass to increase the surface area of contact within the reaction vessel. The rate at which the delta-4-tetrahydrophthalimide derivative is passed through the tube will vary somewhat with the particular starting material employed, the shape and relative dimensions of the reaction vessel, the temperature, and the pressure which is ordinarily in the range of about 1 to 760 mm. However, contact times, calculated on the volume of free space in the reaction tube, of from 0.05 to 50.0 seconds and preferably from 0.05 to 10.0 seconds have proven satisfactory in my invention. Longer contact times may be used but at the risk of promoting decomposition and/or polymerization of the reaction products particularly at the higher temperatures and pressures in the ranges cited above.

I have found that under the above specified conditions the delta-4-tetrahydrophthalimide derivative reacts almost exclusively to form maleimide and the cyclic conjugated diene

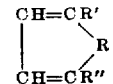

which can be collected at the exit of the reaction tube, together with unreacted starting material, if any. The latter can be recovered and recycled for further use, as can the cyclic, conjugated diene which can be reconverted to the delta-4-tetrahydrophthalimide derivative in the manner previously indicated, thus adding to the economy of my process.

Although the foregoing description of my invention has been concerned only with the synthesis of maleimide, my method is equally applicable to the preparation of N-substituted maleimides from the N-substituted-delta-4-tetrahydrophthalimide derivatives of the type formula:

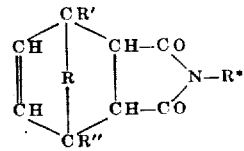

where R, R' and R" are as defined above and R* may be hydrogen, alkyl (e. g., methyl, ethyl, propyl, isopropyl, n-butyl, isobutyl, amyl, hexyl, cyclohexyl, heptyl, octyl, nonyl, decyl, undecyl, dodecyl and stearyl), alkenyl (e. g., allyl, methallyl, crotyl, 4-pentenyl and 10-undecylenyl), and aryl (e. g., phenyl, tolyl, xylyl, xenyl and 2-naphthyl).

The following examples disclose my invention in more detail. All parts are by weight.

EXAMPLE 1

One hundred and thirty parts of molten 3,6-endomethylene-delta-4-tetrahydrophthalimide (J. Am. Chem. Soc. 66, 404–7 (1944)) at about 180° C. are vaporized by passing through a 15-inch length of 30 mm. heat-resistant glass tubing which is packed with quartz chips and heated at 260–270° C. The vaporized material is then passed through a 36-inch length of 30 mm. heat-resistant glass tubing, packed with quartz chips and maintained at about 400° C. and 13 mm. pressure, in the course of 100 minutes (contact time of approximately 0.46 sec.). Ninety-one parts of solid are collected in a receiver attached to the exit of the reaction tube, and 11.3 parts of cyclopentadiene are condensed in a Dry-Ice cooled trap attached to the receiver.

Fractional distillation of the solid in the receiver yields, in addition to some unreacted starting material, 44.3 parts of maleimide, b. 102–5° C./7 mm.; m. 91–3° C.

EXAMPLE 2

In Table I below are summarized additional preparations of maleimide according to my invention in which the effect of variations in the contact time, temperature and pressure are illustrated:

Table I

| | 3,6-Endomethylene-delta-4-tetrahydrophthalimide | Reaction Temperature | Reaction Pressure | Contact Time | Maleimide |
|---|---|---|---|---|---|
| | | ° C. | mm. | Sec. | |
| a | 110.0 | 375 | 16 | 2.4 | 13.25 |
| b | 49.5 | 425 | 18 | 4.3 | 15.85 |
| c | 73.0 | 425 | 17 | 1.1 | 19.76 |
| d | ¹ 70.0 | 450 | ² 760 | 15.2 | 1.85 |
| e | ¹ 62.0 | 450 | 375 | 14.0 | 1.30 |
| f | 111.0 | 400 | 15 | 0.57 | 32.2 |
| g | 130.0 | 400 | 13 | 0.46 | 44.3 |

¹ Molten reactant added directly to reaction tube without preliminary vaporization.
² Reactant diluted with equimolar volume of nitrogen.

EXAMPLE 3

3,6-epoxy-delta-4-tetrahydrophthalimide is prepared by the reaction of 3,6-epoxy-delta-4-tetrahydrophthalic anhydride with ammonium hydroxide and fusion of the resulting ammonium salt. This new compound melts at 153.5–154° C.

This compound is converted to maleimide in high yields by heating according to the method of previous examples at 200–220° C. and 20 mm.

EXAMPLE 4

3,6-endo-(9,10-anthrylene)-delta-4-tetrahydrophthalimide is prepared from 3,6-endo-(9,10-anthrylene)-delta-4-tetrahydrophthalic anhydride in the manner of Example 3. This new compound melts at 304–5° C. Upon treatment at elevated temperatures and reduced pressures as in previous examples this compound yields maleimide and anthracene.

EXAMPLE 5

(a) N-Ethyl-3,6-endomethylene-delta-4-tetrahydrophthalimide is prepared by treating a slurry of 166 parts of 3,6-endomethylene-delta-4-tetrahydrophthalic anhydride in 175 parts of benzene with an excess of ethyl amine. The mixture is refluxed under a Dry-Ice cooled condenser until clear, after which the benzene is removed by distillation. The crude residual solid (185 parts) is decolorized with charcoal and recrystallized from a 20–80 mixture of ethanol and water to yield the desired imide, m. 78–9° C.

Analysis:

Found, N(Dumas), 7.25%; theory, 7.33%.

(b) Eighty-six and five-tenths parts of the above N-ethyl-3,6-endomethylene-delta-4-tetrahydrophthalimide are vaporized and passed through the reaction tube at 400° C. and 17 mm. pressure as in Example 1 above, in the course of 70 minutes (contact time of 0.75 sec.). The materials collected at the exit of the tube consist of 29.8 parts of N-ethyl maleimide (b. 74–6° C./9 mm.; m. 44–6° C.), 16.6 parts of cyclopentadiene; and some unreacted starting material.

EXAMPLE 6

(a) The new compound N-allyl-3,6-endomethylene-delta-4-tetrahydrophthalimide is prepared from allyl amine and 3,6-endomethylene-delta-4-tetrahydrophthalic anhydride by the procedure used in Example 3 above. The product, upon recrystallization from n-hexane, melts at 58–9° C.

Analysis:

Found, N(Dumas), 6.96%; C, 70.99%; H, 6.30%.

Theory, N, 6.90%; C, 70.90%; H, 6.40%.

(b) Eighty-five and five-tenths parts of the above N-allyl-3,6-endomethylene-delta-4-tetrahydrophthalimide are vaporized and passed through a reaction tube at 400° C. and 20 mm. pressure in the course of 85 minutes (contact time of 1.14 sec.) as in Example 1. In addition to some reacted starting material, 14.8 parts of cyclopentadiene and 35.7 parts of N-allyl maleimide are obtained, the latter m. 44–5° C.; b. 89–90° C./9 mm.

Analysis:

Found, N(Dumas), 9.92%; C, 61.67%; H, 5.12%.

Theory, N, 10.2%; C, 61.25%; H, 5.10%.

Having thus described my invention, what I claim and desire to protect by Letters Patent is:

1. A method of making maleimide and N-substituted derivatives thereof which comprises passing a compound of the formula

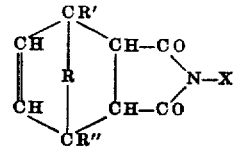

where X is from the class consisting of hydrogen and alkyl; R is from the class consisting of an oxygen atom, an alkylene group, and the 9,10-anthrylene group; R' and R" each are from the class consisting of hydrogen and alkyl, through a heated reaction zone at a temperature in the range from 200° C. to 500° C., and at a velocity which will result in a contact time at said temperature of 0.05 to 50 seconds.

2. A method of making maleimide and N-substituted derivatives thereof which comprises passing a compound of the formula

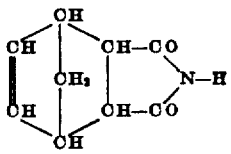

3. A method of making maleimide and N-substituted derivatives thereof which comprises heating a compound of the formula

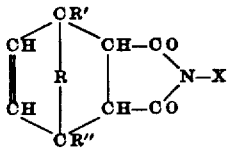

where X is from the class consisting of hydrogen and alkyl; R is from the class consisting of an oxygen atom; an alkylene group, and the 9,10-anthrylene group; R' and R'' each are from the class consisting of hydrogen and alkyl, in a reaction zone, at a temperature in the range from 200° C. to 500° C., removing and recovering the desired products from the reaction zone.

PLINY O. TAWNEY.

REFERENCES CITED

The following references are of record in the file of this patent:

UNITED STATES PATENTS

| Number | Name | Date |
|---|---|---|
| 2,393,999 | McCrone | Feb. 5, 1946 |
| 2,405,559 | Bousquet | Aug. 13, 1946 |

OTHER REFERENCES

Jour Am. Chem. Soc.; vol. 68, pages 2112-2115 (Oct. 1946).